United States Patent
Tirak et al.

(10) Patent No.: US 9,366,377 B2
(45) Date of Patent: Jun. 14, 2016

(54) REVERSIBLE VIEWING DISPLAY MOUNTING

(71) Applicant: Diebold Self-Service Systems division of Diebold, Incorporated, North Canton, OH (US)

(72) Inventors: Michael Tirak, Canfield, OH (US); Pedro Tula, North Canton, OH (US); Nathaniel Oberly, East Canton, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 180 days.

(21) Appl. No.: 14/281,174

(22) Filed: May 19, 2014

(65) Prior Publication Data

US 2014/0339388 A1 Nov. 20, 2014

Related U.S. Application Data

(60) Provisional application No. 61/824,607, filed on May 17, 2013.

(51) Int. Cl.
| | |
|---|---|
| *E04G 3/00* | (2006.01) |
| *F16M 11/10* | (2006.01) |
| *F16M 11/20* | (2006.01) |
| *F16M 13/02* | (2006.01) |
| *G07F 19/00* | (2006.01) |

(52) U.S. Cl.
CPC ........... *F16M 11/10* (2013.01); *F16M 11/2014* (2013.01); *F16M 13/02* (2013.01); *G07F 19/201* (2013.01); *G07F 19/205* (2013.01)

(58) Field of Classification Search
CPC ....... G07F 19/00; G07F 19/201; G07F 19/20; G07F 19/205; F16M 13/02; F16M 11/2014; F16M 11/10
USPC .............. 248/276.1, 282.1; 235/379, 375; 705/43; 902/8, 30
See application file for complete search history.

(56) References Cited

U.S. PATENT DOCUMENTS

| | | | | |
|---|---|---|---|---|
| 5,984,177 A * | 11/1999 | Do | ...... | G07D 11/0081 235/379 |
| 7,063,254 B2 * | 6/2006 | Tula | ...... | G06Q 20/1085 235/379 |
| 7,832,629 B1 * | 11/2010 | Ramachandran | ....... | G07F 19/20 235/375 |
| 8,833,538 B2 * | 9/2014 | Oh | .......... | G07F 19/20 194/350 |
| 2010/0126805 A1 * | 5/2010 | Oh | .......... | G07F 19/20 186/37 |
| 2014/0048594 A1 * | 2/2014 | Kovacs | ............. | G07D 11/0063 235/379 |

* cited by examiner

*Primary Examiner* — Todd M Epps
(74) *Attorney, Agent, or Firm* — Black, McCuskey, Souers & Arbaugh LPA

(57) ABSTRACT

In an example embodiment, a mounting structure for mounting a display monitor to a panel. The mounting allows the display monitor to be rotated so that it can be seen from either side of the panel.

13 Claims, 9 Drawing Sheets

REVERSIBLE VIEWING DISPLAY MOUNTING

CROSS REFERENCE TO RELATED APPLICATIONS

This application claims the benefit under 35 U.S.C. §119 of U.S. Provisional Application No. 61/824,607, filed May 17, 2013.

TECHNICAL FIELD

The present disclosure relates generally to video display devices.

BACKGROUND

Automated banking machines can be used to carry out a transaction which may be operative to transfer value to or from at least one financial account. Automated banking machines, such as automated teller machines (ATMs) may be used to carry out transactions such as dispensing cash, making of deposits, transfer of funds between accounts, and account balance inquiries.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
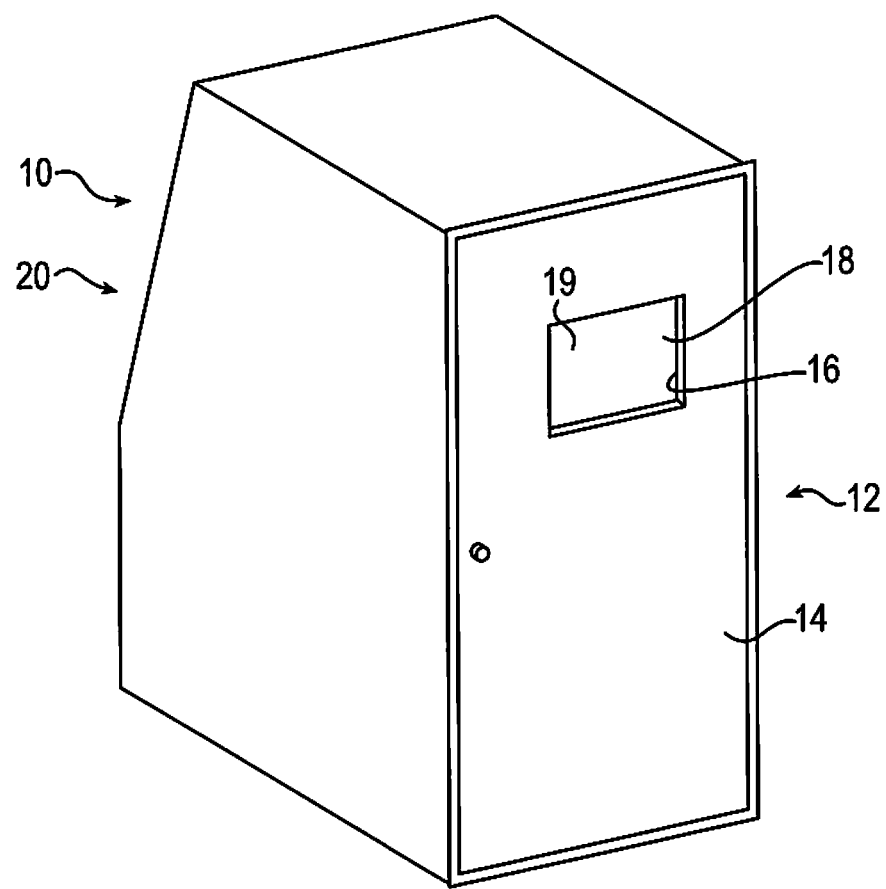
FIG. 1 is an isometric view illustrating an example of a housing upon which an example embodiment can be implemented.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus, comprising a first bracket for mounting a onto a surface having an aperture. The first bracket is configured to rotate about a first axis. A second bracket couples a display with the first bracket. The second bracket is rotatably coupled with the first bracket to rotate about a second axis. In a first position, an output of the display is observable through the aperture. After rotating the first bracket about the first axis and the second bracket about the second axis, the display is in a second position where the output of the display is observable in a direction opposite the aperture.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 is an isometric view illustrating a housing 10 upon which an example embodiment can be implemented. The housing 10 has a first side 12 with a door 14. The door 14 has an opening 16. This allows a display 18 from being viewed from outside the housing via an output (e.g., a screen) 19.

In an example embodiment, the housing 10 is employed for an automated banking machine, such as an automated teller machine (ATM). A user interface on the second side 20 of the housing allows customers to use the ATM. The user interface may suitably comprise readers, such as a card reader, wireless reader, or a combination of a card reader and wireless reader, a user display for displaying transaction information, instructions, or both transaction information and instructions. The ATM may further include a cash dispenser and one or more deposit interfaces that allow for the deposit of one or more of cash, checks, or other financial documents. In this embodiment, the display 18 may be employed for providing service data to personnel servicing the ATM. In a first position, the output of the display is visible through the aperture.

Figure 2:
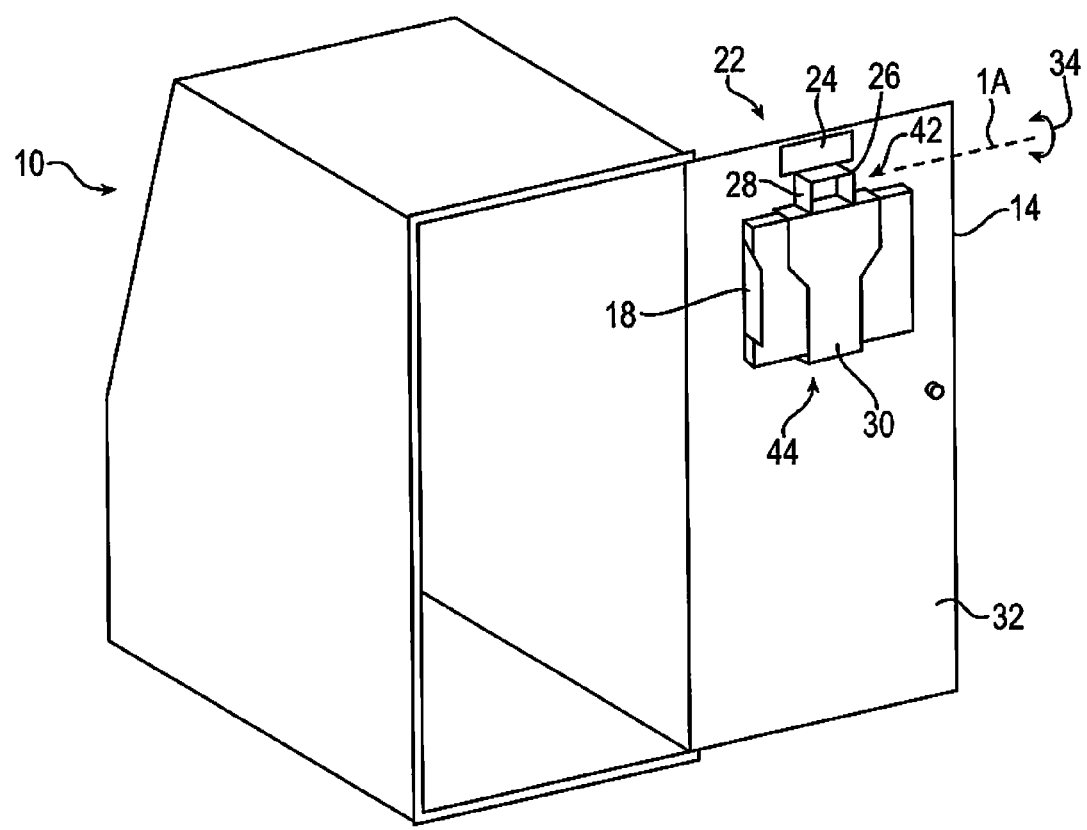
FIG. 2 is an isometric view illustrating an example of the housing of FIG. 1 with the door opened and the display on a first position.

FIG. 2 is an isometric view illustrating the housing 10 of FIG. 1 with the door 14 opened. A first bracket 22 that comprises a swivel base 24 coupled with a first U shaped piece 26 is mounted onto the interior surface 32 of the door (or surface) 14. The first bracket 22 further comprises a second U shaped piece 28 that is rotatably coupled with the first U shaped piece 26. In the illustrated example, the second U shaped piece rotates about an axis 1A as indicated by arrow 34. A second bracket 30, which holds the display 18 is rotatably coupled with the second U shaped piece 28 of the first bracket 22. The second bracket having a first side 42 that is coupled with the first bracket 22 and a second side 44 that is opposite the first side.

Figure 3:
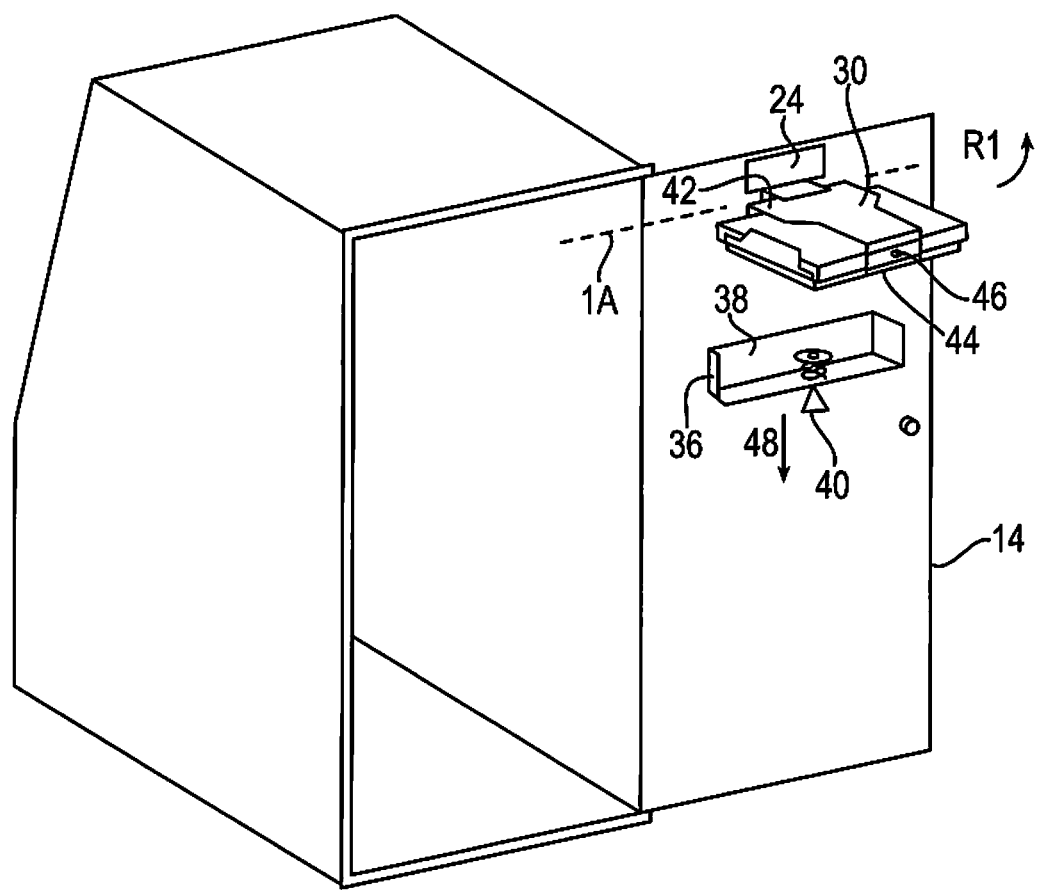
FIG. 3 is an isometric view illustrating an example of the display being rotated about a first axis.

FIG. 3 is an isometric view illustrating an example of the display 18 being rotated about the first axis 1A. In the illustrated example, the display is rotated in direction R1 away from the door 14.

In an example embodiment, a stop 36 is provided to prevent the display from being rotated in the first direction R1. The top comprises a pin 38 and a handle 40. The pin 40 engages an aperture 46 at the opposite end 44 of the second bracket. In order to rotate the display 18 in the first direction R1, the handle 40 is moved in direction 48 to release the pin 38 from aperture 46. In particular embodiments, pin 38 is spring biased to engage aperture 46.

Figure 4:
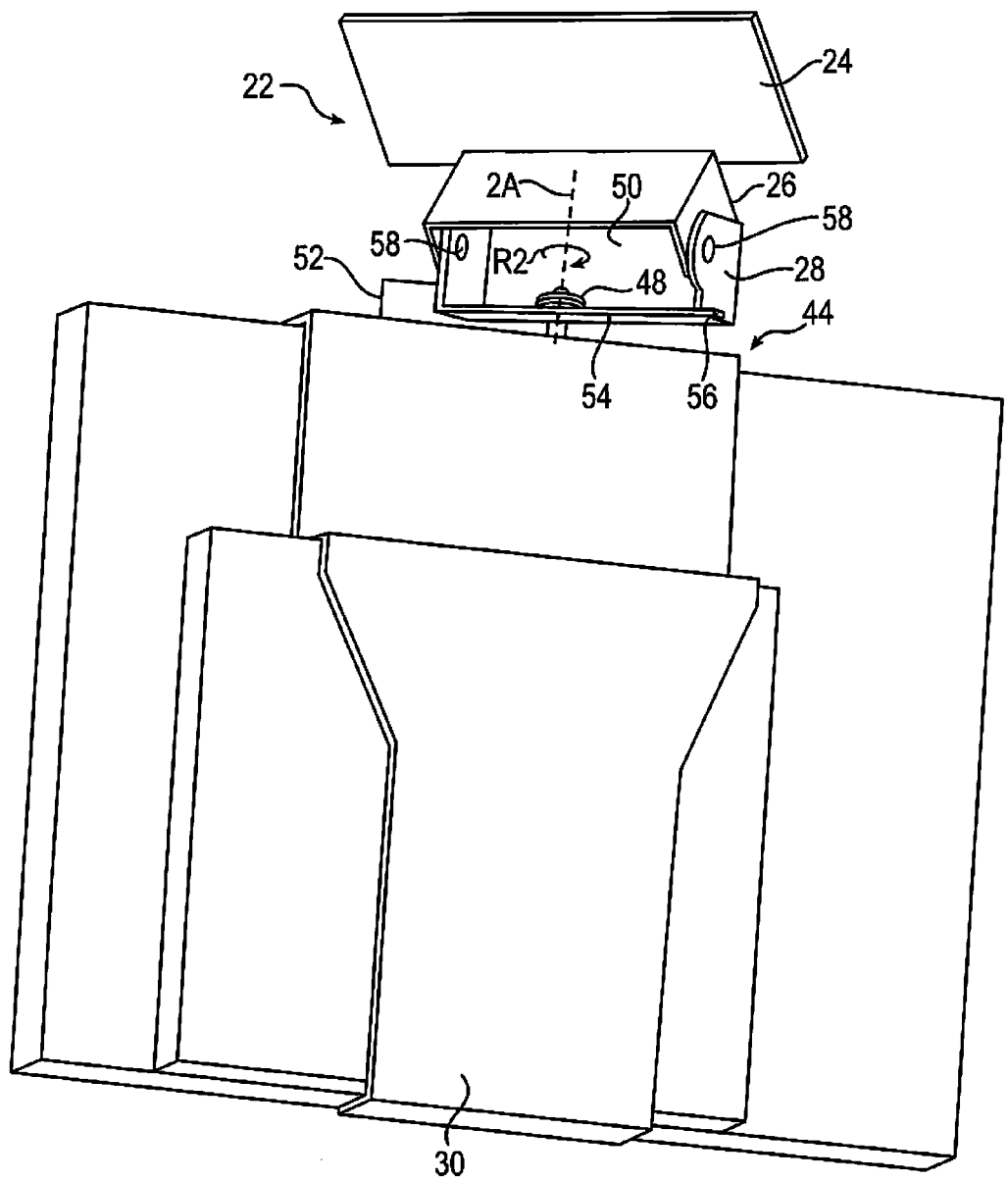
FIG. 4 is an isometric view illustrating an example of the display being rotated about a second axis.

FIG. 4 is an isometric view illustrating an example of the display 18 being rotated about a second axis 2A. In this example, the display is rotated in the direction R2 to move the display from the first position to the second position. Those skilled in the art should readily appreciate that the display is rotated in a direction opposite of R2 to move the display from the second position to the first position.

In the illustrated example, the first bracket 22 is rotationally coupled to the second bracket 30 by a pin 50. The direction axis 48 is about the pin 50.

In particular embodiments, the second bracket 30 further comprises a tab 52. The tab 52 engages a rotational stop 56 on the base of the 54 of the second U shaped piece 28. The rotational stop 56 prevents the display 18 from being rotated more than a predefined angle (e.g., one hundred and eighty degrees) about axis 48. This can prevent wires coupled to the display from being twisted due to over rotation of the display 18 that can lead to failure of the display 18.

Figure 5:
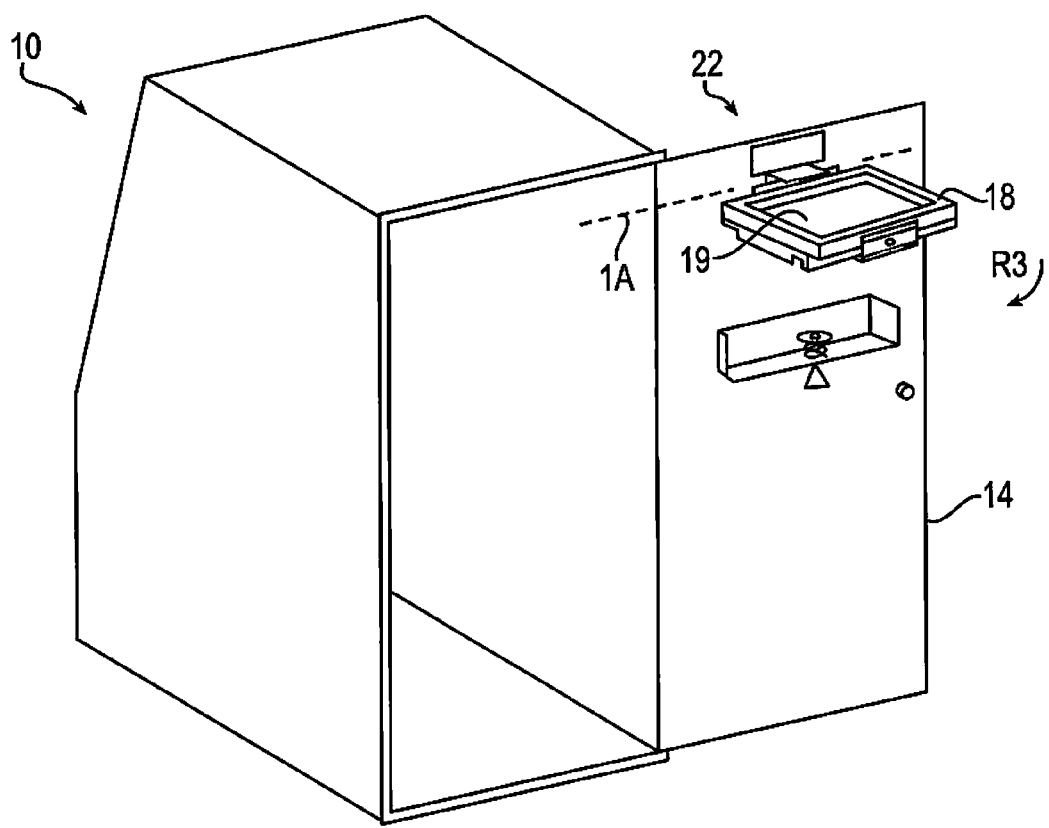
FIG. 5 is an isometric view illustrating an example of the display in FIG. 3 after rotating one hundred eighty degrees about the second axis.

FIG. 5 is an isometric view illustrating an example of the display 18 in FIG. 3 after rotating one hundred eighty degrees about the second axis. The display 18 may then be rotated in direction R3 about axis 1A to be in the second position.

Figure 6:
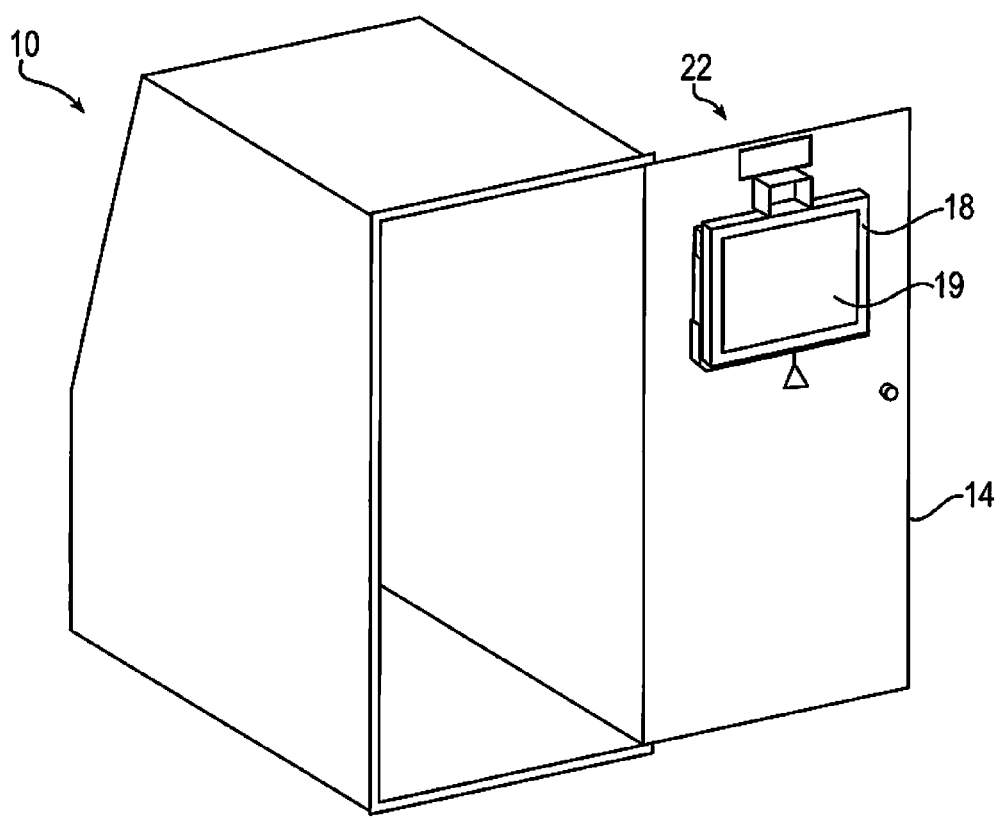
FIG. 6 is an isometric view illustrating an example of the display in a second position.

FIG. 6 is an isometric view illustrating an example of the display 18 in a second position. In this position, the display 18 is viewable from inside the door This can allow a service technician to view the display 18 while the door 14 is open. For example, while the display 18 is in the first position, the display 18 is viewable through opening 16 in the door, thus while in the first position a mirror or constant moving of the door would be required to view the display 18 while in the first position. Those skilled in the art should readily appreciate that to return the display 18 to the first position, the display is again rotated in direction R1 about the first axis 1A, then in a direction opposite R2 about the second axis 2A, and then in direction R3 about the first axis 1A.

Figure 7:
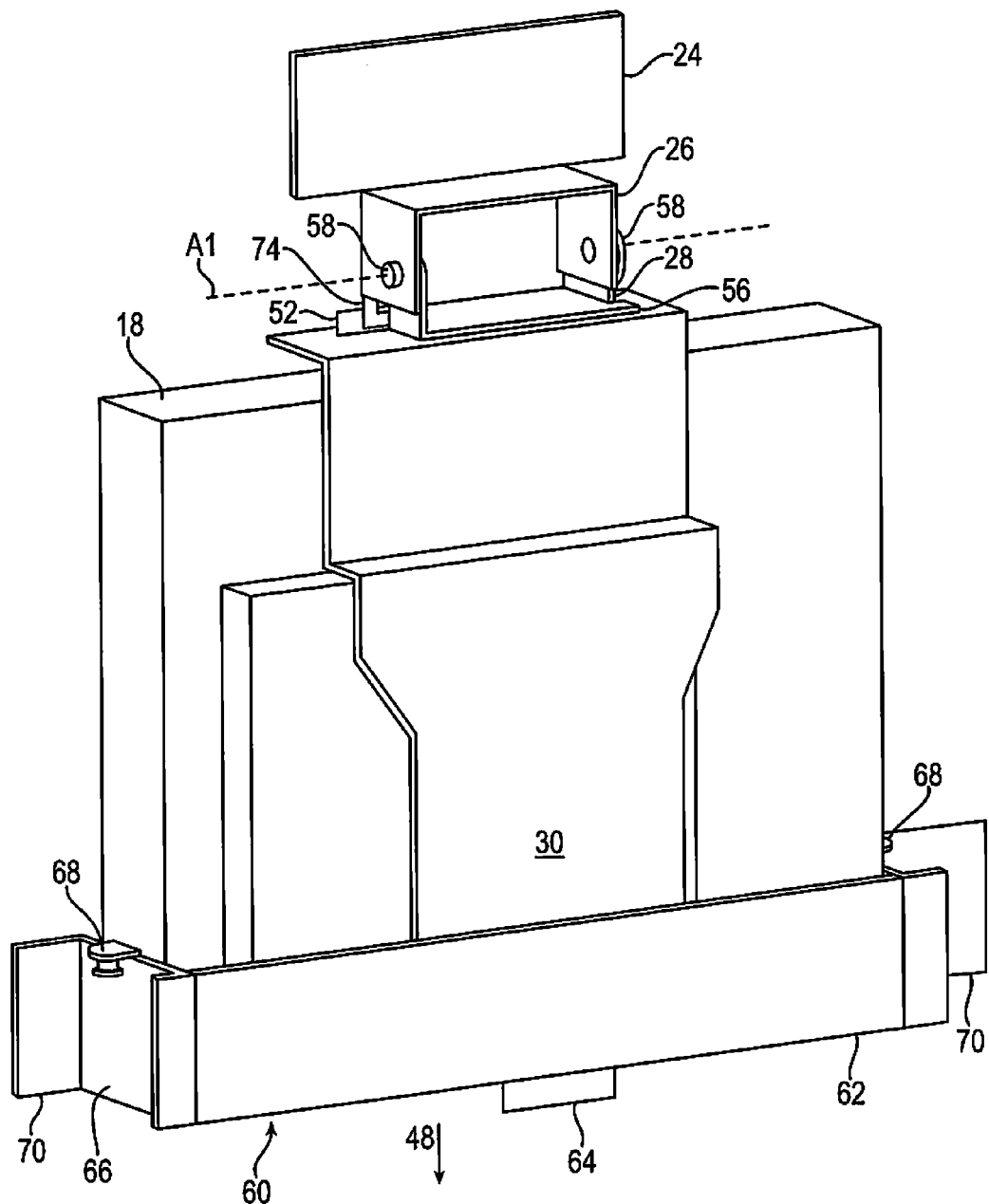
FIG. 7 is an isometric view illustrating an example of a display in the first position with a stop preventing the display from rotating about the first axis.

FIG. 7 is an isometric view illustrating an example of a display 18 in the first position with a stop 60 preventing the display from rotating about the first axis. In the illustrated example, the stop 60 has a front surface 62 that engages the display 18 and the second bracket 30 to prevent the display from being rotated about the first axis A1. Sides 66 of the display are coupled with mounting surfaces 70 that are mounted onto the interior of door 14. Fasteners 68 are coupled with the mounting surfaces 70 and stop 60 and allow the front surface 62 of stop 60 to move to engage and disengage the second bracket 30 and the display 18. In an example embodiment, the fasteners 68 biased so that the front surface 62 is engaged with the second bracket 30 and the display 18. A gripping surface 64 is provided to allow a person to grasp stop 60 and by moving the stop 60 in direction 48, which disengages stop 60 from the second bracket 30 and the display 18.

Figure 8:
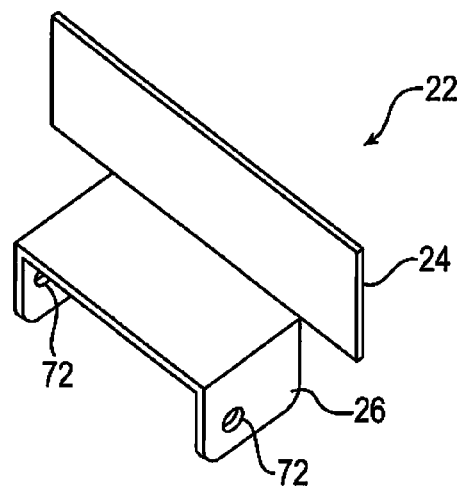
FIG. 8 is a detailed view of the swivel base and first U shaped piece of the first bracket.

FIG. 8 is a detailed view of the swivel base 22 and first U shaped piece 24 of the first bracket 22. The first U shaped piece 26 is at a fixed angle (in this example ninety degrees). from the swivel base 22.

Figure 9:
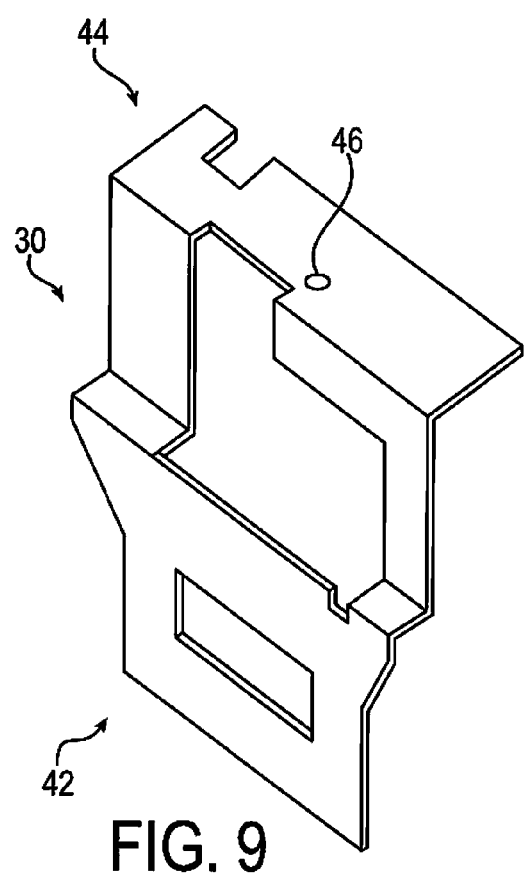
FIG. 9 is a detailed isometric view illustrating an example of a second bracket.

FIG. 9 is a detailed isometric view illustrating an example of a second bracket 30. The first side 42 of the second bracket 30 is coupled with the first bracket 22. In particular embodiments, an aperture 46 is provided on the opposite side 44 of the second bracket 30 for engaging a pin to hold the bracket in place and prevent the second bracket 30 from rotating.

Figure 10:
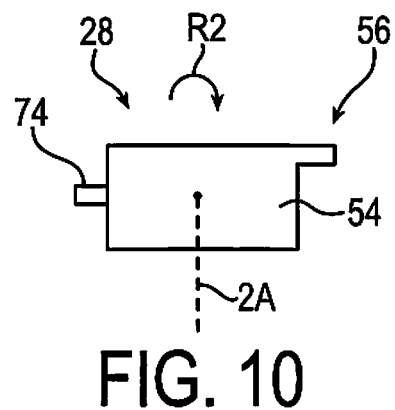
FIG. 10 is an isometric view illustrating an example of a base of the second U shaped piece of the first bracket with stops.

FIG. 10 is an isometric view illustrating an example of a base 54 of the second U shaped piece 28 of the first bracket with stops 56 and 74. Stop 56 stops the rotation R2 in a first direction. Stop 74 stops rotation in the direction opposite of direction R2. In particular embodiments, the stops 56, 74 are offset in a plane by a distance D1 that is equal to the width of the display 18, second bracket 30, or both the display 18 and second bracket 30.

Figure 11:
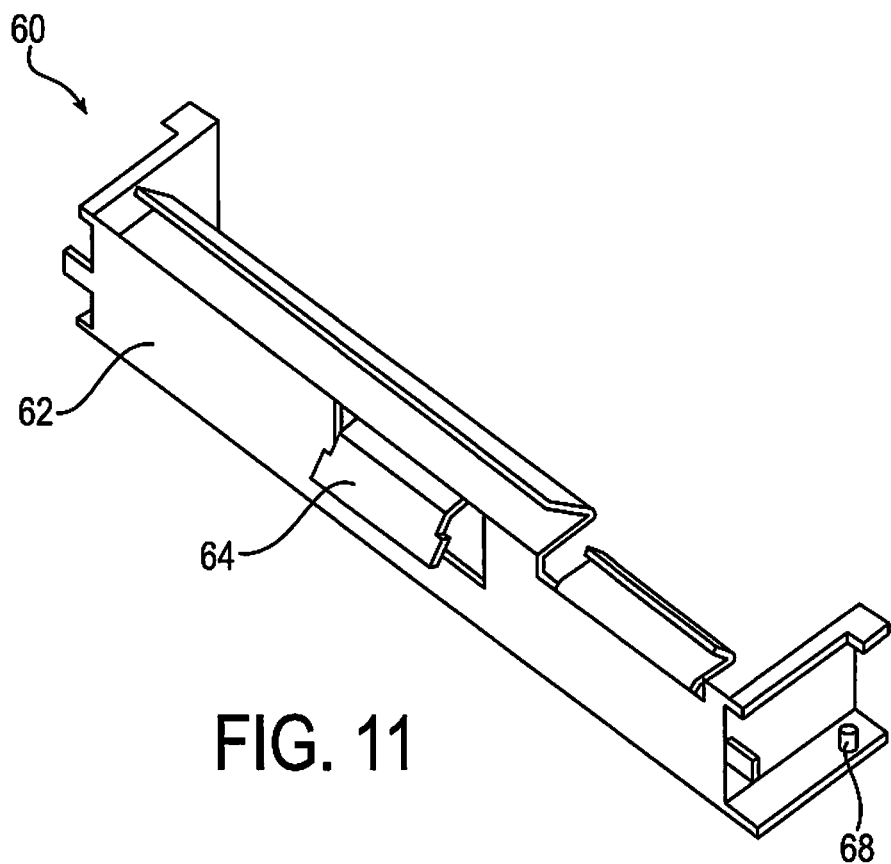
FIG. 11 is an isometric view illustrating an example of a stop in accordance with an example embodiment.

FIG. 11 is an isometric view illustrating an example of a stop 60 in accordance with an example embodiment. The gripping surface 64 allows a user to hold onto the stop 60 and move the stop 60.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a first bracket for mounting onto a surface having an aperture, the first bracket is configured to rotate about a first axis;
a second bracket coupling a display with the first bracket, the second bracket is rotatably coupled with the first bracket to rotate about a second axis;
wherein in a first position, an output of the display is observable through the aperture; and
wherein after rotating the first bracket about the first axis and the second bracket about the second axis, the display is in a second position where the output of the display is observable in a direction opposite the aperture.

2. The apparatus set forth in claim 1, the first bracket comprises a swivel base, a first U shaped piece, and a second U shaped piece;
wherein the first U shaped piece is coupled with the swivel base in a fixed position; and
wherein the second U shaped piece is rotatably coupled with the first U shaped piece.

3. The apparatus set forth in claim 2, wherein a self clinch fastener couples the first U shaped piece with the second U shaped piece.

4. The apparatus set forth in claim 2, wherein the second bracket is rotatably coupled with the second U shaped piece.

5. The apparatus set forth in claim 4, the second bracket comprises a tab that engages a rotational stop on the first bracket that prevents the second bracket from rotating more than one hundred a first predefined angle.

6. The apparatus set forth in claim 5, the first bracket further comprises a second rotational stop that engages the tab on the second bracket to prevents the second bracket from rotating more than a second predefined angle.

7. The apparatus set forth in claim 1, wherein the second bracket has a first side coupled with the first bracket and a second side opposite the first side, the apparatus further comprises:
a stop that selectively engages the second bracket at the second side, the stop prevents the display from rotating about the first axis when engaged with the second bracket.

8. The apparatus set forth in claim 7, wherein the second bracket further comprises an aperture; and wherein the stop comprises biased pin that engages the aperture to prevent the display from moving.

9. The apparatus set forth in claim 8, wherein the pin is spring biased to engage aperture, the apparatus further comprises a handle attached to the pin to allow the pin to be moved in a direction away from the second bracket to disengage the pin from the aperture.

10. The apparatus set forth in claim 7, the stop further comprises a surface that engages the second bracket to prevent the display from rotating in the first direction.

11. The apparatus set forth in claim 10, wherein the stop is biased to prevent movement of the display; and
wherein moving the stop in a direction away from the second axis allows the display to rotate about the first axis.

12. The apparatus set forth in claim 10, the stop further comprises a gripping surface.

13. The apparatus set forth in claim 1, wherein the second axis is orthogonal to the first axis.

\* \* \* \* \*